United States Patent
Moody et al.

(10) Patent No.: US 9,393,525 B2
(45) Date of Patent: Jul. 19, 2016

(54) FORWARD OSMOSIS: RECYCLABLE DRIVING SOLUTES

(75) Inventors: Charles D. Moody, Golden, CO (US); Robert L. Riley, La Jolla, CA (US); John C. Franklin, Yuma, AZ (US)

(73) Assignees: The United States of America, as represented by the Department of the Interior, Washington, DC (US); Separation Systems Technology, San Diego, CA (US); John C. Franklin, Yuma, AZ (US)

( * ) Notice: Subject to any disclaimer, the term of this patent is extended or adjusted under 35 U.S.C. 154(b) by 1000 days.

(21) Appl. No.: 13/082,639

(22) Filed: Apr. 8, 2011

(65) Prior Publication Data

US 2013/0220927 A1 Aug. 29, 2013

(51) Int. Cl.
| | |
|---|---|
| C02F 1/44 | (2006.01) |
| B01D 1/02 | (2006.01) |
| B01D 61/00 | (2006.01) |
| C02F 103/08 | (2006.01) |

(52) U.S. Cl.
CPC ............ *B01D 61/002* (2013.01); *B01D 61/005* (2013.01); *C02F 1/445* (2013.01); *B01D 2311/06* (2013.01); *B01D 2311/2669* (2013.01); *C02F 2103/08* (2013.01); *Y02W 10/37* (2015.05)

(58) Field of Classification Search
None
See application file for complete search history.

(56) References Cited

U.S. PATENT DOCUMENTS

| | | | |
|---|---|---|---|
| 3,130,156 A * | 4/1964 | Neff | 210/177 |
| 3,216,930 A | 11/1965 | Glew et al. | |
| 2009/0308727 A1 | 12/2009 | Kirts | |
| 2010/0155331 A1 | 6/2010 | Bryan et al. | |
| 2011/0017666 A1 | 1/2011 | Cath et al. | |

OTHER PUBLICATIONS

Cath, T.Y., Childress, A.E., and Elimelech, M., "Forward Osmosis: Principles, applications, and recent developments" Science Direct (2006) 281:70-87.
Moody, C.D., Yi, D.H., Riley, R.L., Kessler, J.O., and Norris, M.D., Power Point Presentation: "Desalination by Forward Osmosis" American Membrane Technology Assoc. (2007) Conference & Exposition, Las Vegas, NV Jul. 25, 2007.
Moody, C.D., Yi, D.H., Riley, R.L., Kessler, J.O., and Norris, M.D., "Desalination by Forward Osmosis" American Membrane Technology Assoc. (2007) Conference & Exposition, Las Vegas, NV Jul. 25, 2007.
Moody, C., "Forward Osmosis Water Purification" Western Water and Power Solution Bulletin (2009) Bulletin No. 36.

* cited by examiner

*Primary Examiner* — Krishnan S Menon
(74) *Attorney, Agent, or Firm* — John D. Fado; Gail E. Poulos

(57) ABSTRACT

A forward osmosis method for desalination includes recyclable driving solutes which are easy to remove and recycle, have a high rejection by forward osmosis membranes, have low toxicity and are cost efficient.

4 Claims, 2 Drawing Sheets

FORWARD OSMOSIS: RECYCLABLE DRIVING SOLUTES

BACKGROUND OF THE INVENTION

1. Field of the Invention

This invention relates to a forward osmosis method using recyclable driving solutes which are easy to remove and recycle, have a high rejection by forward osmosis membranes, have low toxicity and are cost efficient.

2. Description of the Related Art

Osmosis occurs when two solutions of differing osmolar concentrations are separated by a membrane permeable to the solvent but not to the solutes. In osmosis, water flows spontaneously from the low concentration source solution to the high concentration driving solution. With the abundance of seawater available and the increasing demand for water suitable for drinking and industrial use, seawater desalination is important. Many methods of desalination have been developed including technologies for distillation, reverse osmosis, freezing, electrodialysis, ion exchange, and forward osmosis.

Forward osmosis may be employed for different purposes. For producing pure water from seawater, Murray ("Desalting Seawater with Ammonia, Part 2: Osmosis" Water and Sewage Works, Volume 15, page 525, 1968) suggests an ammonium carbonate driving solution. The ammonium carbonate would be removed from the product water by stripping. Muller ("Fresh Water for Arizona by Salt Replacement Desalination", Hydrology and Water Resources in Arizona and the Southwest, Volume 4, 127, 1974) suggests a sucrose driving solution. After extraction of water from seawater, the sugar would be combined into larger molecules, thereby lowering the osmotic pressure of the product solution. The solution could then be dewatered by ultrafiltration. The pure water permeate is the final product and the solute molecules would be subjected to enzymatic hydrolysis to become sucrose for recycling. A process using forward osmosis to provide the hydrostatic driving pressure for reverse osmosis desalination is described in Popper et al ("Desalination by Osmosis-Reverse Osmosis Couple", Science, Volume 159, 1364-1365, 1968). For power production, Loeb ("Production of Energy from Concentrated Brines by Pressure-Retarded Osmosis, I. Preliminary Technical and Economic Correlations," Journal of Membrane Science, Volume 1, 49-63, 1976; "Production of Energy from Concentrated Brines by Pressure-Retarded Osmosis, II. Experimental Results and Projected Energy Costs", Journal of Membrane Science, Volume 1, 249-269, 1976) has proposed a "Pressure-Retarded Osmosis" power plant which uses osmosis to produce a solution under a high hydrostatic pressure. The high pressure of the solution can be recovered as electricity with a hydroturbine-generator.

Forward osmosis may be employed in situations which do not require the separation of pure solvent. One application is the concentration or dewatering of a solution where the fate of the solvent is irrelevant. Concentration of fruit juices has been suggested (Sourirajan, Reverse Osmosis, Academic Press, New York, 1970; Loeb and Bloch, "Countercurrent Flow Osmotic Processes for the Production of Solutions Having a High Osmotic Pressure", Desalination, Volume 13, 207, 1973). Results on fruit juice concentration have been reported by Popper et al. ("Dialyzer Concentrates Beverages", Food Engineering, Volume 38 (4), 102-104, 1966) and Mizutani et al., ("Osmotic Concentration by Using Reverse Osmosis Membranes", Journal of Applied Polymer Science, Volume 20, 2305-230, 1976). Wang (Yuma Desalting Test Facility, Yuma, Arizona, Private Communication, 1975) used reverse osmosis followed by forward osmosis for recovery of proteins from whey. For simultaneous dehydration and hydration requirements, Randal et al. ("Application of Product Return Osmosis to Reduce Energy in Beet-Sugar Processing", Energy Use Conference: Proceedings of the International Conference, R. A. Fassolare and C. B. Smith, eds., Pergamon Press, New York, Volume 1, 837-844, 1977) have proposed osmosis as an energy-saving method for concentrating sugar beet extract while hydrating the molasses by-product.

Another type of situation occurs in irrigation where water containing salt solutes deleterious to plants may be readily available. The forward osmosis method can be used to transfer water from a brackish source solution to a harmless or useful one containing fertilizer, thereby reclaiming a resource that would otherwise be lost (Moody and Kessler, An Initial Investigation into the Use of Direct Osmosis as a Means for Obtaining Agricultural Water from Brackish water, University of Arizona, Internal Report, 1971; Moody and Kessler, "Application of Direct Osmosis: Possibilities for Reclaiming Wellton-Mohawk Drainage Water", Hydrology and Water Resources in Arizona and the Southwest, Volume 5, 101, 1975). In an analogous situation, forward osmosis can produce emergency potable water for humans in small ocean vessels such as life boats. In that case, the process transfers water from the sea into a concentrated nutrient solution (Kessler and Moody, "Drinking Water from Sea Water by Forward Osmosis", Desalination, Volume 18, 297-306, 1976; Murray, "Desalting Seawater with Ammonia, Part 2: Osmosis", Water and Sewage Works, Volume 115, 525, 1968).

The concept of forward or direct osmosis as a practical commercial process has been recognized since at least the 1930's. See, for example, U.S. Pat. No. 2,116,920. This patent discloses the use of a concentrated sugar and $CaCl_2$ aqueous solution to "pull" water out of fruit juices. The general process has been in continuous commercial use to manufacture fruit juice concentrates since at least that time. The concept of a removable "driving solute" in forward osmosis driven separation is disclosed by Charles Moody (Dissertation. School of Renewable Natural Resources The University of Arizona, 1977). He outlines the use of dissolved $SO_2$ as an osmotic agent that would increase an effluent's molality above that of sea water, thereby creating a forward osmotic bias that would cause fresh water migration through a semipermeable membrane from a sea water influent. The $SO_2$ would then be removed from the effluent by increasing the effluent temperature to drive it out as a gas.

Cath et al. (Journal of Membrane Science, Volume 281, Issues 1-2, 70-87, 2006) state that the concentrated solution on the permeate side of a membrane used in forward osmosis is the source of the driving force in the process. The reference lists different terms to name the concentrated solution and these include draw solution, osmotic agent, osmotic media, driving solution, osmotic engine, sample solution or just brine.

Cath et al. (U.S. Published Patent Application US2006/0144789 and PCT Application PCT/US2007/071141) disclose methods and systems for purifying liquids using at least one forward osmosis unit for diluting a water source for a downstream desalination unit. Cath et al. use a draw solution having a solute concentration close to that of seawater and discloses as useful draw solutions seawater, concentrated seawater, or other suitable hypertonic solutions.

In U.S. Pat. No. 3,617,547, Albert Halff and Allen Reid use an approach similar to that of U.S. Pat. No. 6,391,205. In both cases, an osmotic agent composed of salts, whose solubility is very temperature dependent is used to increase an effluent's molality above that of sea water, thereby creating a forward osmotic bias that would cause fresh water migration through a semi-permeable membrane from a sea water influent. The osmotic agent is removed by lowering the solution temperature to precipitate the solute out of solution. The precipitate is removed, re-dissolved in water aided by heating and then recycled. The water obtained from the filtered precipitate solution could be further purified, or used as is. These processes are encumbered by the energy inefficient need to chill all of the permeate and recycle streams, as well as the need to reheat the recycle.

Keith Lampi et al. in U.S. Pat. No. 6,849,184 describe an approach of obtaining fresh water from impure or sea water by a combination of forward osmosis and reverse osmosis. Salt and sea water are introduced into a chamber with two semipermeable membranes and then sealed; the introduced solution, therefore, has a molality greater in comparison to that of ordinary sea water. Ordinary sea water is then exposed to a first one of the two semipermeable membranes, which causes the sea water solvent, i.e., fresh water, to cross the first membrane. As the fresh water passes through the first membrane and into the sealed chamber, the internal pressure of the sealed chamber increases. The container is constructed such that the second membrane is in a zone of the sealed chamber still containing sea water largely unmixed with the introduced salt. As the sealed chamber internal pressure increases beyond the osmotic pressure of sea water, fresh water solvent is forced through the second membrane via reverse osmosis. The salt/sea water solution in the sealed chamber would then be discarded. Although possibly practical as a survival device, this invention requires the continuous re-supply of salt or highly concentrated salt solution and is not amenable to a continuous process approach.

Hough (U.S. Pat. No. 3,721,621; issued Mar. 20, 1976) discloses a forward osmosis system wherein a second solution solute is removable by precipitation. The second solution solute solubility is dependent upon pH. The Patent discloses carbonates, oxalates, tartrates, and the like, metals such as calcium, strontium, barium, nickel, cobalt, copper, mercury, silver, iron, and the like. The Patent states that the preferred solutes include iron sulfide and/or calcium sulfite.

Glew (U.S. Pat. No. 3,216,930; issued Nov. 9, 1965) teaches a process for liquid recovery and solution concentration that uses mixtures of water and another gas such as for example, sulfur dioxide; or liquid such as for example aliphatic alcohols with from about 4 to about 6 carbon atoms and alicyclic alcohols having from about 4 to about 6 carbon atoms, as draw solutions for forward osmosis.

While there are various systems and driving solutions for utilizing forward osmosis to purify liquids, there still remains a need in the art for a more effective system for the removal of unwanted substances from liquids. The present invention, different from prior art systems, provides a system and novel driving solutions for use in forward osmosis systems.

SUMMARY OF THE INVENTION

It is therefore an object of the present invention to provide a method for desalination that includes the steps of providing a fluid for desalination, providing a forward osmosis driving solution wherein the solution has a high osmotic pressure, is chemically compatible with said forward osmosis membrane, has a low membrane solute transport coefficient, is nontoxic, and is readily removed and recyclable; drawing said fluid for desalination into a forward osmosis extractor having a salt rejecting membrane with a source side wherein said fluid is drawn into extractor on the source side of the membrane, drawing said driving solution into said extractor on the opposite permeate side of said membrane from the fluid for desalination and counterflow to said fluid for desalination in order to form a forward osmosis product containing water-diluted driving solution.

Another object of the present invention is to provide a method for desalination wherein the forward osmosis product is distilled to form water and a vapor.

A still further object of the present invention is to provide a method for desalination wherein the vapor from the distillation step is condensed to form a recyclable liquid driving solution which is recycled back to the forward osmosis extractor.

Another object of the present invention is to provide a method for desalination wherein the driving solution is tert-butanol.

Further objects and advantages of the invention will become apparent from the following description.

DETAILED DESCRIPTION OF THE INVENTION

Figure 1:
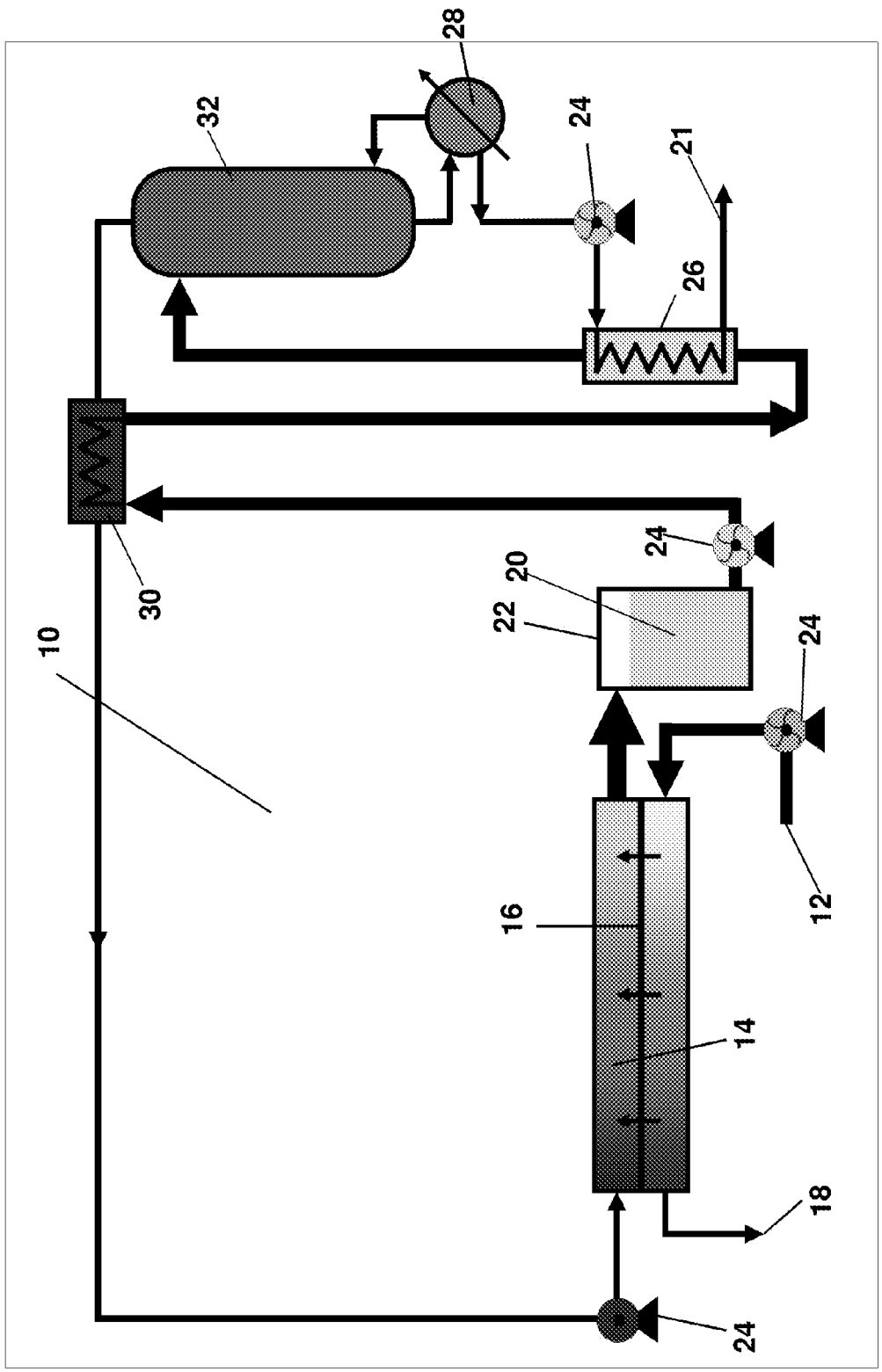
FIG. 1 is a schematic drawing of a Forward Osmosis System 10 showing fluid feed 12, forward osmosis extractor 14, salt rejecting membrane 16, fluid concentrate 18, forward osmosis product 20, surge tank 22, pumps 24, heat recovery heat exchanger 26, reboiler 28, condenser heat exchanger 30, and distillation column 32.

The principal advantages of forward osmosis (FO) over other purification processes currently available are:

1. The only energy required is in the initial construction, maintenance, and sometimes the distribution pumping of fluids. This low-energy feature is important in remote installations, such as lifeboats or primitive agriculture, or where the energy costs are high.

2. The elimination of hydrostatic pressure differences results in advantages over the popular reverse osmosis method.

a. There is no membrane compaction problem.

b. For extracting water from an infinite source, seawater for example, it is not necessary to increase the concentration of the source solution. This advantage both minimizes the work required to extract the water and reduces the pretreatment requirements.

c. The mechanical construction may utilize lightweight plastics which would be inexpensive and not subject to corrosion.

d. There is no need for expensive, high noise, and potentially dangerous high pressure pumping systems which require extensive operator training and maintenance checks.

The chief disadvantage of forward osmosis for fresh water production is that the water produced contains dissolved solutes used to drive the process. Unless these solutes are to be consumed anyway, as is the case for plant fertilizers and human nutrients, the cost of these driving solutes or the cost to remove the driving solutes must be considered in evaluating the economic feasibility of forward osmosis.

To produce solute-free liquid, forward osmosis requires a second step to remove and recycle the forward osmosis driving solution. In the present invention, the driving solute is judiciously selected based on its ease of removal and recycle, high rejection by the forward osmosis membranes, low toxicity because small amounts may leak through the membrane and some may also remain in the final purified product, and low cost because of likely losses through the membrane and in the final product. An effective forward osmosis system requires forward osmosis driving solutes with the following characteristics:

1. High osmotic pressure; e.g., greater than the osmotic pressure of the liquid source.
2. Chemically compatible with the forward osmosis membranes, i.e., the solute does not significantly decrease the membrane water transport coefficient (A) or significantly increase the membrane solute transport coefficient (B) for sodium chloride and other dissolved solutes.
3. High rejection by forward osmosis membranes, i.e., has a low membrane solute transport coefficient (B).
4. Nontoxic
5. Readily removed and recycled
6. Inexpensive.

In the present invention, the driving solutes that meet all of the above criteria are alcohols including, 2-butanol, and tert-butanol, for example. Methanol, 1-propanol, and 2-propanol meet criteria 1, 5, and 6 but are toxic. Therefore, these three alcohols would only be used for producing a product that will not be consumed and/or will not damage an agricultural crop.

Figure 2:
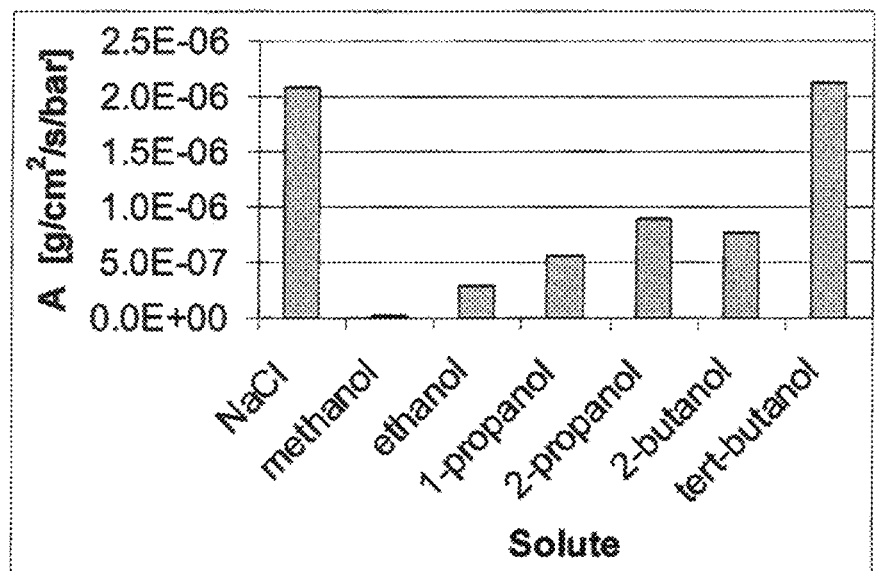
FIG. 2 is a graph showing forward osmosis water transport coefficients (A) for sodium chloride and six alcohol solutes in water. Values are normalized to a reference temperature of 20 degrees C. The membrane is a commercial low-pressure polyamide reverse osmosis membrane (DOW Film Tec XLE).
Figure 3:
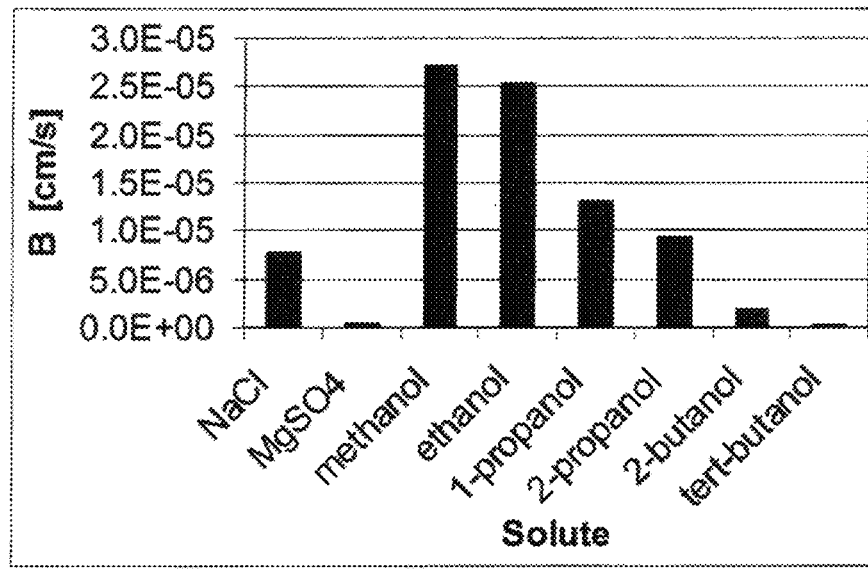
FIG. 3 is a graph showing forward osmosis solute transport coefficients (B) for sodium chloride, magnesium sulfate, and six alcohol solutes in water. Values are normalized to a reference temperature of approximately 20 degrees C. The membrane is a commercial low-pressure polyamide reverse osmosis membrane (DOW Film Tec XLE).

For criteria 2 and 3, Table 1 and FIGS. 2 and 3 show the water and solute transport coefficients measured for sodium chloride (NaCl), magnesium sulfate ($MgSO_4$), methanol ($CH_3OH$), ethanol ($C_2H_5OH$), 1-propanol ($C_3H_7OH$), 2-propanol ($C_3H_7OH$), 2-butanol ($C_4H_9OH$) and tert-butanol ($C_4H_9OH$).

TABLE 1

Water Transport coefficients (A) and solute transport coefficients (B) measured in Forward Osmosis tests with commercial low-pressure polyamide reverse osmosis membrane (DOW FilmTec XLE). Values are normalized to a reference temperature of approximately 20 degrees C.

| Solute | A $10^{-6}$ g/cm$^2$/s/bar | B $10^{-6}$ cm/S |
|---|---|---|
| Sodium Chloride (NaCl) | 2.09 | 7.8 |
| Magnesium Sulfate ($MgSO_4$) | — | 0.46 |
| Methanol ($CH_3OH$) | 0.02 | 27.2 |
| Ethanol ($C_2H_5OH$) | 0.29 | 25.4 |
| 1-propanol ($C_3H_7OH$) | 0.56 | 13.1 |
| 2-propanol ($C_3H_7OH$) | 0.89 | 9.42 |
| 2-butanol ($C_4H_9OH$) | 0.76 | 1.84 |
| Tert-butanol ($C_4H_9OH$) | 2.12 | 0.23 |

For comparison, FIG. 2 and FIG. 3 also show the water and solute transport coefficients measured for the solutes shown in table 1.

With an existing commercial reverse osmosis membrane, tert-butanol meets criteria 2 and 3 and meets criteria 2 and 3 much better than the other alcohols.

For criteria 2, tert-butanol has a water transport coefficient (A) of approximately $2.12 \times 10^{-6}$ g/cm$^2$/s/bar)

For criteria 3, tert-butanol, as shown in Table 1 and FIG. 3, the membrane solute transport coefficient (B) of $B_{tert\text{-}butanol} = 2.3 \times 10^{-7}$ cm/s, much less than that obtained using the same membrane with sodium chloride, where $B_{NaCl} = 7.8 \times 10^{-6}$ cm/s, and also less than for one of the most highly rejected solutes, magnesium sulfate, where $B_{MgSO4} = 4.6 \times 10^{-7}$ cm/s.

Forward Osmosis produces desalted and purified forward osmosis product 20, such as water, by employing driving solutes in sufficient concentration to maintain an osmotic pressure higher than that of salty or contaminated water-containing fluids. The difference in osmotic pressure causes water to flow across the membrane that is permeable to water but not to the dissolved salts and driving solutes. The direction of the flow is from the water containing fluid to the Forward Osmosis driving solution. If the driving solutes consist of plant or human nutrients, the Forward Osmosis product 20 solution may be used to supply part or all of the required water needs of the plant or human. The Forward Osmosis system 10 (FIG. 1) of the present invention includes a forward osmosis extraction unit 14 which includes a semi-permeable membrane 16. As those persons skilled in the art will appreciate, extraction unit 14 semi-permeable membrane 16 can be any one of a number of design configurations including but not limited to spiral wound, hollow fiber, or flat sheet. Membrane 16 can be any reverse osmosis membrane that is chemically compatible with the solutes of the present invention. Chemically compatible is defined as any membrane where the solute does not significantly decrease the membrane water transport coefficient (A) or significantly increase the membrane solute transport coefficient (B) which are described above.

Fluid is drawn into the fluid feed 12 from an appropriate source by a feed pump 24 and enters forward osmosis extraction unit 14 on the source side of the membrane 16 (see arrows, FIG. 1). Water from the fluid flows across membrane 16 because of the higher osmotic pressure driving solution flowing in a countercurrent manner to the flow of the fluid on the source side of membrane 16. A fluid concentrate 18 is removed from extraction unit 14 while the forward osmosis product 20 flows to surge tank 22.

To produce a solute-free water, the system of the present invention includes steps to remove and recycle the Forward Osmosis (FO) driving solute. The solutes of the present invention were selected based on the ease of removal and recycle, high-rejection by the Forward osmosis membranes 16, low toxicity because small amounts of the solute may leak through the membrane and some may also remain in the final purified product, and low cost because of the likely losses through the membrane and in the final product. Solute-removal of the present invention includes the use of a stripping section of a conventional distillation column 32. The Forward Osmosis desalted product leaves extractor unit 14 and enters surge tank 22. From tank 22, the FO product is pumped by a pump 24 into condenser heat exchanger 30 which transfers heat from the column 32 top product to the desalted FO product feed and condenses the column 32 top product from vapor to liquid for recycle as FO feed. Desalted FO product exits exchanger 30, flows through energy recovery heat exchanger 26, and enters distillation column 32 at or near the top of column 32 where the product is stripped of solutes. Energy in the form of heat is added to reboiler 28. Reboiler 28 can be located outside of column 32 as is shown in FIG. 1 or at the bottom of and inside column 32 (not shown). The desalted product water, which is stripped of solutes, flows from the bottom of column 32 and is pumped into energy recovery heat exchanger 26 by a pump 24. Distillation column 32 contains sufficient equilibrium trays or packing to achieve a very low concentration of driving solute in the bottom liquid product. Heat Exchanger 26 is used to transfer heat from the desalted stripped product exiting from the bottom of column 32 to the desalted product feed stream which enters near the top of column 32. Vapor, rich in driving solute, produced in column 32 exits from the top of column 32 and enters heat exchanger 30. The driving solute-rich vapor is condensed in heat exchanger 30 to reform the liquid driving solution which then is recycled back to the forward osmosis extractor unit 14 using pump 24 operatively connected between heat exchanger 30 and extractor unit 14.

The heating requirement for distillation column 32 can be supplied by any energy source. Preferred energy sources included low-temperature sources such as, for example, low-pressure steam, solar energy, waste heat, or other sources of thermal energy. Distillation column 32 can operate at atmospheric pressure, i.e., near approximately 1 bar (approximately 15 psi) absolute pressure. In order to operate at a lower temperature, column 32 can be operated at pressures less than atmospheric using a vacuum pump especially to enable the use of low-temperature thermal energy, such as for example, from waste heat sources. Compared to desalination distillation processes, the forward osmosis solute removal and recycle step has much lower energy requirements because it vaporizes much less material-the driving solute with only some of the water.

The following examples are intended only to further illustrate then invention and are not intended to limit the scope of the invention which is defined by the claims.

EXAMPLE 1

This example describes the procedures used to measure the membrane transport coefficients for sodium chloride shown in FIG. 2. A source solution contains approximately 2,000 grams of deionized water initially at 20.0 degrees centigrade, with an initial osmotic pressure of approximately 0 bar (0 psi). The driving solution contained approximately 64.4 grams of sodium chloride and approximately 2,000 grams of deionized water initially at approximately 20.0 degrees centigrade with an initial osmotic pressure of approximately 25.0 bar (approximately 362 psi). The two solutions circulated on either side of a semipermeable polyamide-type Dow Film Tec XLE reverse osmosis membrane with the membrane polyamide active layer facing the driving solution. The membrane measured approximately 13.5 cm wide by approximately 24.6 cm long for an area of approximately 332 cm². The system operated for approximately 3 hours with the source water temperature reaching approximately 25.5 degrees centigrade. The water flow across the membrane was measured at between approximately 1 and 3 hours of operation. At approximately 24.6 degrees C., in response to the slightly diluted driving solution osmotic pressure of approximately 23.4 bar, approximately 1.11 grams/minute of water flows from the source solution to the driving solution. In the absence of hydrostatic pressure difference across the membrane, the following solution-diffusion equation describes water transport though the membrane, $$Q = A \times S \times (\pi_d - \pi_s)$$

Where:
Q=Membrane water flux (g/cm²/s)
A=Water Transport coefficient (g/cm²/s/bar)
S=Membrane area (cm²)
$\pi$=Osmotic pressure (bar)
d=Driving solution
s=Source solution
By equation 1, for Q=0.019 g/s (=1.11 g/min), S=332 cm², $\pi_d$=23.4 bar, and $\pi_s$=0 bar, then A=2.38×10⁻⁶ g/cm²/s/bar.

Normalizing by approximately 3% per degree Celsius, at a reference temperature of approximately 20 degrees C., A=2.09×10⁻⁶ g/cm²/s/bar.

EXAMPLE 2

In this example the water transport coefficient (A) was measured using tert-butanol as the driving solution. 2000 grams of source solution water, initially at approximately 22.0 degrees C. with an initial osmotic pressure of 0 bars (0 psi) was used with a driving solution containing approximately 140 grams of tert-butanol and 1.860 grams of deionized water initially at approximately 22.0 degrees C. with an initial osmotic pressure of approximately 25.7 bar (372 psi. The two solutions circulated on either side of a semipermeable polyamide-type Dow Film Tec XLE reverse osmosis membrane with the membrane polyamide active layer facing the driving solution. The membrane measured approximately 13.5 cm wide by approximately 24.6 cm long for an area of approximately 332 cm². The system operated for approximately 3 hours with the source water temperature reaching approximately 26.0 degrees C., and the following water flow across the membranes was measured between 2 and 3 hours of operation. At approximately 25.9 degrees C., in response to the slightly diluted driving solution osmotic pressure of approximately 21.6 bar, approximately 1.07 g/min of water is measured flowing from the source solution to the driving solution. By the equation described in example 1 above, for Q=0.018 g/s which is equal to 1.07 g/min, S=332 cm², $\pi_d$=21.6 bar, and $\pi_s$=0 bar, then A=2.51×10⁻⁶ g/cm²/s/bar. Normalizing by approximately 3% per degree Celsius, at a reference temperature of approximately 20 degrees C., A=2.12×10⁻⁶ g/cm²/s/bar.

EXAMPLE 3

This example describes how the solute transport coefficient (B) of sodium chloride was measured. A source solution containing approximately 64.4 grams of sodium chloride and approximately 2,000 grams of deionized water was used at an initial temperature of approximately 13.0 degrees C. and an initial osmotic pressure of approximately 24.4 bar (approximately 354 psi). A driving solution containing approximately 318.2 grams of fructose and approximately 1,801.4 grams of deionized water was used at an initial temperature of approximately 13.0 degrees C. and an initial osmotic pressure of approximately 24.0 bar (approximately 348 psi). The solutions circulated on either side of a semipermeable polyamide-type Dow FilmTec XLE reverse osmosis membrane which measured approximately 13.5 cm wide by approximately 24.6 cm long for an area of 332 cm². The membrane polyamide active layer faces the source solution. The system operated for approximately 3 hours with the source water temperature reaching approximately 21.0 degrees C. Because of the close-to-equal osmotic pressures of the source and driving solutions, the water flow across the membrane measures approximately a low 0.07 g/min between approximately 1 and 3 hours of operation. The conductivity of the fructose driving solution measured approximately 5 µS/cm initially and, after about 3 hours, approximately 610 µS/cm, which corresponds to a sodium chloride concentration of approximately 413 mg/L. Between approximately 1 and 3 hours of operation, the temperature averaged approximately 18.7 degrees C., and the conductivity increased from approximately 183 µS/cm to approximately 610 µS/cm, which corresponds to an increase in sodium chloride concentration of approximately 117 mg/L to approximately 413 mg/L (approximately 0.117 mg/cm$^3$ to approximately 0.413 mg/cm$^3$ (Cds)) in the driving solution and a solute flux of approximately 2.4×10$^{-4}$ mg/cm$^2$/s (=413 mg/L−117 mg/L)/(120 min×60 s/min)×1.9 L/332 cm$^2$).

The following solution-diffusion equation describes solute transport through the membrane:

$$N_s = B_s \times (C_{ss} - C_{ds})$$

Where:
$N_s$=Flux of source solute (mg/cm$^2$/s)
$B_s$=Solute transport coefficient for source solute (cm/s)
$C_{ss}$=Concentration of source solute in source solution (mg/cm$^3$)
$C_{ds}$=Concentration of source solute in driving solution (mg/cm$^3$)

For $N_s$=2.4×10$^{-4}$ mg/cm$^2$/s, $C_{ss}$=31.6 mg/cm$^3$, and $C_{ds}$=0.262 mg/cm$^3$, then $B_s$=7.5×10$^{-6}$ cm/s at about 18.7 degree C. Normalizing by approximately 3% per degree Celsius, at a reference temperature of approximately 20 degrees C., $B_s$=7.8×10$^{-6}$ cm/s.

EXAMPLE 4

To measure the solute transport coefficient (B) of tert-butanol, the source solution contained approximately 64.4 grams of sodium chloride and approximately 2,000 grams of deionized water initially at approximately 24.0 degrees C. and an initial osmotic pressure of approximately 25.3 bar (367 psi). The driving solution contained approximately 140 grams of tert-butanol and approximately 1,860 grams of deionized water initially at a temperature of approximately 24.0 degrees C. and an initial osmotic pressure of approximately 25.1 bar (364 psi). The solutions circulated on either side of a semipermeable polyamide-type Dow Film Tec XLE reverse osmosis membrane. The membrane area measured approximately 13.5 cm wide by 24.6 cm long for an area of approximately 332 cm$^2$. The membrane polyamide layer faced the driving solution. The system operated for approximately 3 hours with the source water temperature reaching approximately 25.3 degrees C. Because of the close-to-equal osmotic pressures of the source and driving solutions, the water flow across the membrane measured approximately a low 0.06 g/minute between approximately 0 and three hours of operation. The concentration of total organic carbon (TOC) in the sodium chloride source solution measured approximately 0 mg/L initially and, after three hours, approximately 21.7 mg/L, which corresponds to a tert-butanol concentration of approximately 33.5 mg/L (=approximately 21.7 mg carbon/L×74 g/mole weight of tert-butanol/48 grams/mole for four carbon molecules per molecule of tert-butanol). Between approximately 0 and three hours of operation, the temperature averaged approximately 24.9 degrees C., and the concentration of tert-butanol in the source solution increased from approximately 0 to 33.5 mg/L (approximately 0 mg/cm$^3$ to approximately 0.0335 mg/cm$^3$ (Csd)). This increase corresponded to a solute flux of approximately 1.86×10$^{-5}$ mg/cm$^2$/s (=approximately 33.5 mg/L−0 mg/L)/(180 min×60 s/min)×2.0 L/332 cm$^2$). The following solution-diffusion equation describes solute transport through the membrane:

$$N_d = B_d \times (C_{dd} - C_{sd})$$

Where: $N_d$=flux of driving solute (mg/cm$^2$/s)
$B_d$=Solute transport coefficient for driving solute (cm/s)
$C_{dd}$=Concentration of driving solute in driving solution (mg/cm$^3$)
$C_{sd}$=Concentration of driving solute in source solution (mg/cm$^3$)

For $N_d$=1.86 mg/cm$^2$/s, $C_{dd}$=69.1 mg/cm$^3$, and $C_{sd}$=0.0335 mg/cm$^3$, then $B_d$=2.7×10$^{-7}$ cm/s at approximately 24.9 degrees C. Normalizing by approximately 3% per degree Celsius, at a reference temperature of approximately 20 degrees Celsius, $B_d$=2.3×10$^{-7}$ cm/s.

Table 1 below lists the extreme and preferred concentration ranges for tert-butanol. For tert-butanol as the driving solute and with seawater as the source water, the forward osmosis product 20 contains approximately 8-10% driving solution. The bottoms product from the distillation column contains approximately 0 to 4 mg/L tert-butanol, which can be readily removed, for example, by adsorption by an activated carbon filter or by a very low-pressure RO membrane filter. The distillate recycle contains approximately 60 to 80 percent driving solute, which is recycled to the forward osmosis extractor.

Table 1, below, lists the extreme and preferred ranges of concentrations for tert-butanol. Table 2, below, lists the extreme and preferred ranges of pressures with tert-butanol. Table 3, below, lists the extreme and preferred temperature ranges with tert-butanol.

TABLE 1

Concentration ranges for Forward Osmosis (FO) with tert-butanol

| Process Location | Extreme range, percent by mass | Preferred range, percent by mass |
|---|---|---|
| FO feed | 10 to 90 | 30 to 80 |
| FO product | 1 to 20 | 3 to 15 |
| Bottoms product from the distillation column | 0 to 0.004 (0 to 40 mg/L) | 0 to 0.0004 (0 to 4 mg/L) |
| Distillate recycle | 10 to 90 | 30 to 80 |

TABLE 2

Absolute pressure ranges for Forward Osmosis (FO) with tert-butanol

| Process Location | Extreme range, bar (psia) | Preferred range, bar (psia) |
|---|---|---|
| FO feed | 0.5 to 4.0 (7.5 to 60) | 1.3 to 3.0 (20 to 45) |
| FO product | 0.3 to 2.0 (5 to 30) | 0.5 to 1.0 (7.5 to 15) |
| Bottoms product from the distillation | 0.2 to 1.0 (3 to 15) | 0.5 to 1.0 (7.5 to 15) |
| Distillate recycle at top of distillation column | 0.2 to 1.0 (3 to 15) | 0.5 to 1.0 (7.5 to 15) |

TABLE 3

Temperature ranges for Forward Osmosis (FO) with tert-butanol.

| Process Location | Extreme range, C | Preferred range, C |
|---|---|---|
| FO feed | 0 to 85 | 3 to 85 |
| FO product | 0 to 40 | 3 to 30 |
| Bottoms product from the distillation column | 30 to 100 | 40 to 100 |
| Distillate recycle at top of distillation column | 20 to 90 | 30 to 90 |

The foregoing detailed description is for the purpose of illustration. Such detail is solely for that purpose and those skilled in the art can make variations therein without departing from the spirit and scope of the invention.

INDEX OF THE ELEMENTS

10. Forward Osmosis System
12. Fluid Feed
14. Extraction Unit
16. Semipermeable Membrane
18. Fluid Concentrate
20. Forward Osmosis Desalted Product
21. Forward Osmosis Desalted Stripped Product
22. Surge Tank
24. pump
26. Energy Recovery Heat Exchanger
28. Reboiler
30. Condenser Heat Exchanger
32. Distillation Column

We claim:

1. A method for desalination consisting essentially of:
   (a) providing a fluid for desalination,
   (b) providing a polyamide membrane,
   (c) providing a forward osmosis driving solute which is tert-butanol,
   (d) drawing said fluid for desalination into a forward osmosis extractor having said membrane with a source side wherein said fluid is drawn into the extractor on the source side of said membrane,
   (e) pumping said driving solution into said extractor on the side opposite of the source side of said membrane in a countercurrent flow to said fluid for desalination to form a desalinated forward osmosis product.

2. The method of claim 1 further consisting essentially of distilling said desalinated forward osmosis product to collect desalinated liquid at the bottom of a distillation column and driving solute-rich vapor at the top of the distillation column.

3. The method of claim 2 further consisting essentially of condensing said driving solute-rich vapor in a condenser heat exchanger to form a liquid driving solution by transferring heat from said vaporized driving solution to said condenser heat exchanger.

4. The method of claim 3 further consisting essentially of condensing said driving solute-rich vapor in a condenser heat exchanger by transferring heat from said driving solution vapor to said condenser heat exchanger and recycling said liquid solution to said forward osmosis extractor.

* * * * *